United States Patent [19]
Guetz et al.

[11] Patent Number: 6,091,777
[45] Date of Patent: Jul. 18, 2000

[54] CONTINUOUSLY ADAPTIVE DIGITAL VIDEO COMPRESSION SYSTEM AND METHOD FOR A WEB STREAMER

[75] Inventors: William N. Guetz; Keshoolal Bakhru; Fredric W. Ritchey, all of San Diego, Calif.

[73] Assignee: Cubic Video Technologies, Inc., San Diego, Calif.

[21] Appl. No.: 09/084,820

[22] Filed: May 26, 1998

Related U.S. Application Data

[63] Continuation-in-part of application No. 08/976,127, Sep. 18, 1997.

[51] Int. Cl.[7] .............................. H04B 1/66; H04N 7/12
[52] U.S. Cl. ...................... 375/240; 348/384; 348/398; 348/413; 382/242
[58] Field of Search ...................... 348/384, 385, 348/415, 413, 402, 390, 10, 14, 15, 17, 12, 398, 416; 382/232, 244, 239, 246, 250, 242; 395/200.77, 672; 345/336, 337; 341/65; 370/354, 468; 375/240

[56] References Cited

U.S. PATENT DOCUMENTS

| | | | |
|---|---|---|---|
| 4,903,317 | 2/1990 | Nishihara et al. | 382/244 |
| 5,115,426 | 5/1992 | Spanke | 370/468 |
| 5,546,477 | 8/1996 | Knowles et al. | 382/242 |
| 5,557,320 | 9/1996 | Krebs | 348/12 |
| 5,611,038 | 3/1997 | Shaw et al. | 348/390 |
| 5,617,142 | 4/1997 | Hamilton | 348/384 |
| 5,680,129 | 10/1997 | Weinberger et al. | 341/65 |
| 5,745,758 | 4/1998 | Shaw et al. | 395/672 |
| 5,903,673 | 5/1999 | Wang et al. | 348/416 |

*Primary Examiner*—Richard Lee
*Assistant Examiner*—Gims Philippe
*Attorney, Agent, or Firm*—Frank D. Gilliam

[57] ABSTRACT

A cost effective continuously adaptive digital video system and method for compressing color video data for moving images. The method describes capturing an analog video frame and digitizing the image into a preferred source input format for compression using a combination of unique lossy and lossless digital compression techniques including sub-band coding, wavelet transforms, motion detection, run length coding and variable length coding. The system includes encoder and decoder (CODEC) sections for compression and decompression of visual images to provide high compression with good to excellent video quality. The compressed video data provides a base video layer and additional layers of video data that are multiplexed with compressed digital audio to provide a data stream that can be packetized for distribution over inter or intranets, including wireless networks over local or wide areas. The (CODEC) system continuously adjusts the compression of the digital images frame by frame in response to comparing the available bandwidth on the data channel to the available bandwidth on the channel for the previous frame to provide an output data stream commensurate with the available bandwidth of the network transmission channel and with the receiver resource capabilities of the client users. The compression may be further adjusted by adjustment of the frame rate of the output data stream.

34 Claims, 12 Drawing Sheets

NON-INCLUSIVE BOUNDARIES:

ZERO BIN FIRST LEVEL   -3,0,3
ZERO BIN 2ND & 3RD LEVEL  -1,0,1

QUANTIZATION LEVELS  ±63_7BIT

| I | BwRatio =B =TARGET BW/ PREVIOUS BW | Coef-Diff< -2/3*Size LL3 | Coef-Diff>- 2/3* SizeL3 And Coef- Diff<- Size LL3/24 | Coef-Diff>- SizeL3/24 And Coef-Diff< *SizeLL3/ 24 | Coef-Diff> SizeL3/24 And Coef-Diff< M2/3* SizeLL3 | Coef-Diff> 2/3* SizeLL3 |
|---|---|---|---|---|---|---|
| 0 | 0.0<B<0.1 | 2 | 2 | 2 | 1 | 0 |
| 1 | 0.1<B<0.3 | 2 | 2 | 2 | 0 | 0 |
| 2 | 0.3<B<0.5 | 1 | 1 | 1 | 0 | 0 |
| 3 | 0.5<B<0.7 | 1 | 1 | 1 | 0 | 0 |
| 4 | 0.7<B<0.9 | 1 | 1 | 1 | 0 | 0 |
| 5 | 0.9<B<1.0 | 1 | 0 | 0 | 0 | -1 |
| 6 | 1.0<B<1.1 | 0 | 0 | -1 | 0 | -1 |
| 7 | 1.1<B<1.3 | 0 | 0 | -1 | -1 | -2 |
| 8 | 1.3<B<1.5 | 0 | -1 | -2 | -3 | -5 |
| 9 | 1.5<B<1.7 | 0 | -2 | -3 | -4 | -7 |
| 10 | B<1.7 | 0 | -3 | -4 | -6 | -7 |

Fig. 10

| SUBBAND/TYPE | BW-INDEX | | | | | | |
|---|---|---|---|---|---|---|---|
| | 0 | 1 | 2 | 3 | 4 | 5 | 6 |
| LL3/LEVEL-$T_1$ | 3 | 3 | 3 | 3 | 3 | 3 | 3 |
| H3/LEVEL-$T_1$ | 3 | 3 | 2 | 3 | 2 | 3 | 2 |
| H2/COUNT-$T_2$ | 4 | 3 | 3 | 2 | 2 | 1 | 1 |
| H2/LEVEL-$T_1$ | 2 | 2 | 2 | 2 | 2 | 2 | 2 |
| H1/COUNT-$T_2$ | 1 | 1 | 1 | 1 | 1 | 1 | 1 |
| H1/LEVEL-$T_1$ | 1 | 1 | 1 | 1 | 1 | 1 | 1 |

Fig.11

CONTINUOUSLY ADAPTIVE DIGITAL VIDEO COMPRESSION SYSTEM AND METHOD FOR A WEB STREAMER

RELATED APPLICATIONS

The present application is a continuation-in-part of U.S. patent application, Ser. No. 08/976,127 entitled NETWORK ADAPTIVE DIGITAL VIDEO COMPRESSION SYSTEM AND METHOD filed Sep. 18, 1997.

TECHNICAL FIELD

The present invention relates generally to an improvement in the field of digital television systems and more particularly, but not by way of limitation, to a continuously adaptive digital video compression system and method for a web streamer.

BACKGROUND OF THE INVENTION

Multimedia communications is a rapidly developing field. Recent advances in both the computer industry and telecommunications field has made digital video and audio economically viable for visual communications. This progress has been supported by the availability of digital channels such as the narrow band Integrated Services Digital Network (ISDN) and its successor the broadband ISDN and its progress to local area networks (LANs), wide area networks (WANs), digital satellite and wireless networks, digital terrestrial broadcasting channels and corporate intranet networks and will lead to communication-based applications such as video phone, video conference systems, digital broadcast TV/HDTV, remote sensing, and surveillance. Digital storage-based audio visual applications include server-client based data bases, education, training, video-on-demand type entertainment, advertising, and document storage and transfer.

Specific examples of actual and anticipated applications include a web streamer which provides video data streams from stored video clips at a server. Desirably, the video data would be delivered such that there is no need to store the data at the client before displaying. Such an application would provide training on demand, advertising promotions, product demonstrations, product promotions on the internet, music videos and communications between executives of companies and other such uses. Other applications would include sending video data one way for telesales, product support, tourism promotions, road/traffic conditions, security and surveillance, video e-mail and the like. Another exemplary application would be video conferencing such as used for corporate work groups, medical diagnostics and conferencing, distance education and training, customer support and professional conferences. Other contemplated applications of the invention would include further expansion into areas such as live video streamer multicast and multipoint conferencing.

A cost effective digital compression and decompression arrangement for video and audio data streams while delivering high quality video and audio streams is essential for the introduction and widespread use of visual communications. To reduce transmission and storage costs, improved bit rate compression schemes are needed. Image, video, and audio signals are amenable to compression due to considerable statistical redundancy in the signals. Within a single image or a single video frame there exists significant correlation among neighboring samples, giving rise to what is generally termed "spatial correlation." Also in moving images, such as full motion video, there is significant correlation among samples in different segments of time such as successive frames. This correlation is generally referred to as "temporal correlation." However, a difficulty arises in the provision of a digital compression arrangement for a web streamer in that the bandwidth of the transmission channel is subject to change during transmission and clients with varying receiver resources may join or leave the network as well during transmission.

Accordingly, there is a present need in the art for an improved cost effective system and method that uses both spatial and temporal correlation to remove the redundancy in the video to achieve high compression in transmission and to maintain good to excellent image quality while continually adapting to change in the available bandwidth of the transmission channel and to the limitations of the receiving resources of the clients. The purpose of the present invention is then to provide a next-generation cost effective video compression/decompression (CODEC) system for storage and distribution of high quality multimedia information on information networks using personal computers (PCS) that is continuously adaptive to changing conditions.

In reviewing the prior art it is found that a known technique for taking advantage of the limited variation between frames of a television broadcast is known as motion-compensated image coding. In such coding, the current frame is predicted from the previously encoded frame using motion estimation and compensation, and the difference between the actual current frame and the predicted current frame is coded. By coding only the difference, or residual, rather than the image frame itself, it is possible to improve image quality, for the residual tends to have lower amplitude than the image, and can thus be coded with greater accuracy. Motion estimation and compensation are discussed in Lim, J. S. *Two-Dimensional Signal and Image Processing*, Prentice Hall, pp. 497–507 (1990). A frame of estimated motion vectors is produced by comparing the current and previous frames. Typically, each motion vector is simply a pair of x and y values representing estimates of the horizontal and vertical displacement of the image from one frame to the next at a particular location. The motion vectors are coded as side information. In the decoder, the current image frame is computed by summing the decoded residual with a motion-compensated version of the prior image frame. Motion compensation is typically performed on each pixel of the prior frame using bilinear interpolation between nearest motion vectors.

A review of the patent literature has uncovered some patents that are of interest. U. S. Pat. No. 5,218,435 dated Jun. 8, 1993 and issued to J. S. Lim et al for DIGITAL ADVANCED TELEVISION SYSTEMS teaches image quality improvement in high definition television using multi-scale representation of motion compensated residuals. The bandwidth of the subband filters vary with the frequency band and the total number of coefficients in the multi-scale represented frames is equal to the number of values in the residual. Image initialization in the receivers is achieved using original image leakage, but the leakage factor is varied for different frequency subbands. To free up channel capacity at scene changes, a frame-wide decision is made as to whether to motion compensate a particular frame. Chrominance resolution employs encoding all of the subbands of the chroma residuals, instead of just the low subbands.

U.S. Pat. No. 5,043,808 issued on Aug. 27, 1991 to S. C. Knauer et al for HIGH DEFINITION TELEVISION ARRANGEMENT EMPLOYING MOTION COMPEN- SATED PREDICTION ERROR SIGNALS teaches a high definition television system where the television signal is encoded by developing motion vectors that describe the best motion estimate of the image to be transmitted, by developing motion estimation error signals, by encoding these error signals within the same bandwidth as occupied by standard NTSC signals and by transmitting the encoded error signals during periods that correspond to the active scan intervals of the NTSC TV signal. The motion vectors themselves, together with video and control signals, are transmitted during the NTSC retrace period.

U.S. Pat. No. 5,043,810 dated Aug. 17, 1991 issued to F. W. P. Vreeswijk et al for a METHOD AND APPARATUS FOR TEMPORALLY AND SPATIALLY PROCESSING A VIDEO SIGNAL. This patent teaches a system having a transmitting section that has transmitting section signal paths for at least three classes of motion, each with a preprocessing circuit which is provided with means for individually sampling in accordance with separate sampling patterns so that each preprocessing circuit supplies a video signal which is suitable for a display with an optimum distribution of temporal and/or spatial resolution for the associated class of motion. Dependent on the class of motion determined, one of the preprocessing circuits is coupled to a channel so that video signal supplied to the channel is suitable for a display with an optimum distribution of temporal and/or spatial resolution for the given class of motion. The associated receiver also has three receiving section signal paths comprising a postprocessing circuit which decodes a received video signal according to a method which selects the correct postprocessing circuit in accordance with the class of motion so that a display with an increasing spatial resolution can be achieved in the case of a decreasing motion.

U.S. Pat. No. 4,943,855 dated Jul. 24, 1990 issued to H. Bheda et al for PROGRESSIVE SUB-BAND IMAGE CODING SYSTEM. This patent teaches reducing image data redundancies through progressive subband coding. The image is separated into a selected plurality of subbands, and the sub-band with the largest non-redundant data content is chosen and used to predict the data in the other subbands. Only prediction error information of the predicted sub-bands is encoded and transmitted together with the encoded chosen sub-band. An overall performance error signal can also be evaluated at the encoder end and used to further improve performance.

U.S. Pat. No. 5,272,529 issued on Dec. 21, 1993 to J. E. Frederikesen for ADAPTIVE HIERARCHICAL SUB-BAND VECTOR QUANTIZATION ENCODER. This patent teaches a system for data reduction digital video signals based on vector quantization of vectors formed from coefficients of a discrete cosine transform of pixel blocks. The coefficients are grouped into subbands and both scaler and vector quantization are used. Vector quantization is implemented either directly on the vectors or on vectors formed from inter-frame differences between the transformed vectors. The vector quantization searching routine is in accordance with the Voronoi regions resulting from an off-line codeword clustering method using a minimum distance criterion.

U.S. Pat. No. 4,817,182 dated Mar. 28, 1989 for TRUNCATED SUBBAND CODING IMAGES teaches analyzing image data in a number of iterated analysis procedures, using two-dimensional quadrature mirror filters to separate low-pass spatial filter response component and three differently oriented high-pass spatial filter response components, which filter response components are decimated in both dimensions. The high pass filter response components are coded "as is" and the low-pass filter response component is coded "as is" only in the last iteration. In the earlier analysis procedures the low-pass filter response component provides the input data for the succeeding analysis procedure. No motion compensation is taught.

U.S. Pat. No. 4,969,040 dated Nov. 6, 1990 and issued to H. Gharavi for APPARATUS AND METHOD FOR DIFFERENTIAL SUB-BANDING CODING OF VIDEO SIGNALS teaches an arrangement for achieving a high compression of a video signal. The PEL-by PEL difference between an input signal consisting of digital PEL values of a scanned video signal and a motion compensated interframe prediction signal is decomposed into several narrow bands using separable two-dimensional quadrature mirror filtering. Each sub-band is quantized by a symmetric uniform quantizer with a center dead zone. Entropy coders code the quantized values by variable word-length coding the non-zero quantized values and transmitting that information with the corresponding run-length coded positional information. The outputs of the coders are combined into a constant rate bit stream. As required, the dead zones and step sizes of the quantizers are adjusted to force more zero value quantized levels thereby reducing the amount of data.

In *Signal Processing: Image Communication* 2 (1990) pg. 81–94, K. S. Thyagarajan and Harry Sanchez discussed the ENCODING OF VIDEOCONFERENCING SIGNALS USING VDPCM. The techniques of motion detection, interframe linear block prediction and vector quantization were incorporated in an arrangement for encoding monochrome image sequences for video conferencing application. Data compression rate reduction is accomplished by identifying and processing only those regions that exhibit noticeable changes between successive frames, by estimating the magnitude of the change through linear block or vector prediction and quantizing the residual vectors through a vector quantizer. The motion detector uses a modified block matching algorithm to detect the moving blocks. Perceptually-based edged detectors are used to design vector quantizer (VQ) codebooks for different classes of image blocks to achieve better visual quality. Encoding rates under 60 kbps are achieved with acceptable visual quality at nominal computational complexity.

OBJECTS OF THE INVENTION

Accordingly, one object of the present invention is to provide an improved digital video compression arrangement having a continuously adaptive video signal compression/decompression (CODEC) system for storage and distribution of good to excellent multimedia information on information networks using personal computers (PC's).

Yet another object of the present invention is to provide a digital video compression arrangement wherein the encoder continuously adapts the compression to the a designated output data rate commensurate with the presently available bandwidth on the transmission channel and/or to the acceptable data rate for the decoder at the receiver of a client.

Still another object of the present invention is to provide continuously flexible CODEC wherein resolution, image size, and frame rate of the digital color video data stream can be adjusted at the encoder and/or the decoder at client user.

Another object of the present invention is to provide a digital video compression arrangement which provides a plurality of layered compressed video signal data streams representative of a base level visual image and additional layers of added visual details.

Another object of the present invention is to provide a digital video compression arrangement which provides layers of compressed digital video data steams that permit adaption of the arrangement to available information network capacity.

Another object of the present invention is to provide a digital video compression system that provides layers of multicast/multimedia information over an information network to a number of customers that may individually choose the level of visual image they wish to receive.

Another object of the present invention is to provide a CODEC design which provides for the decoder portion to be providable in software only to a recipient personal computer user whereby real time video streams may be decoded without storage of the received data stream at the decoder of a receiver Yet another object of the present invention is to implement the method of the invention by providing the CODEC design in the form of software that is provided to data processing means for providing the encoder and decoder sections of such CODEC.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

Briefly stated, the present invention contemplates a cost effective digital video compression arrangement that is continuously adaptive to available bandwidth capacity on the transmission channel and to the receiver resources of client users for distribution of color video multimedia/multicast information over both packet switched networks and point-to-point communication circuits that use personal computers (PC's). The digital video compression arrangement uses a novel compression/decompression arrangement (CODEC) having encoder and decoder sections to provide continuously adaptive compression and decompression of multicast/multimedia information that includes color video and accompanying audio over packet switched networks and point-to-point communication circuits by means of compressed video and audio signal data streams that are layered to provide a base layer representing a base visual level and progressive additional data streams to provide higher levels of visual resolution. Preferably, the CODEC will be provided as software that is supplied to PC's so that both the encoder and decoder may be provided by the processing of digital data streams by the PC's.

Since the decoder may exist as software that has been transmitted to a receiver PC, the received data streams may be decoded in real time, without storage, to provide a desired visual display. The decoder portion of the CODEC may be provided in the form of software that is transmitted to a recipient user prior to receipt of video and audio signal data streams. The recipient user may also determine the level of visual image desired and select the layers of data streams to be utilized. The encoder portion of the CODEC may receive control signals relating to measurement of network parameters such as the presently available bandwidth of the transmission channel and by receiving feedback from receiving clients or by interrogating the transmission channel during the call setup mode. The CODEC of the system includes a number of unique features to achieve high compression of color video with good-to-excellent video quality.

The novel method of the present invention contemplates compressing input color video data for moving images for a web stream to be transmitted over a transmission channel having a variable bandwidth to client users having receivers that may receive data input at different acceptable data rates. This novel method includes the steps of compressing an input color video data stream for moving images on the basis of a target bandwidth of a data transmission channel to provide a compressed output video data stream and transmitting the compressed output color video data stream to at least one receiver over the transmission channel. The actual bandwidth of the transmission channel is then determined as the compressed output video data stream was transmitted to at least one receiver. The compression of the input color video data stream is then continuously changed on a frame by frame basis in response to such determination whereby the transmission of a subsequent output color video data stream is commensurate with the available bandwidth of the transmission channel.

This novel method contemplates compressing the input color video data stream by detecting the amount of motion that is sensed in the input color video data stream and changing the rate of compression of said input color video data stream to provide an output color video data stream having a data rate commensurate with the available bandwidth of the transmission channel. This data rate by also be adjusted by adjusting the frame rate of the output compressed data stream so that the output data stream becomes commensurate with the available bandwidth of the transmission channel and to the receiver resources of the least capable client user of the web stream.

More specifically, the novel method of the present invention contemplates continually determining the actual bandwidth of the transmission channel as the compressed output video data stream is transmitted to a receiver and continually changing the compression of the video data stream to adapt the bit rate of the data stream to be commensurate with the available variable bandwidth of the transmission channel and/or to the receiver resources of the least capable receiver that receives a web stream of the layered video and audio data. The compression of the input color video data stream is determined by detecting the amount of motion that is occurring between successive frames. This detection of motion is accomplished by determining whether a plurality of variable thresholds have been exceeded. By continually monitoring the available bandwidth of the transmission channel and the receiver resources of the clients, the thresholds are continually updated on a frame-by-frame basis to thereby adjust the bit rate of the output data stream to be commensurate with the immediately available bandwidth. The novel invention also provides that in addition to varying the thresholds to determine motion between frames by comparing pixel blocks of successive frames, the frame rate of the output color video data stream may also be adjusted to further vary the data rate of such data stream to an optimum rate.

The method of the present invention also preferably contemplates converting the input RGB color video signal to a preferred YUV format and then spectrally decomposing the image frames of such YUV signal to a plurality of multifrequency subbands to a plurality of levels. These subbands are then quantized to provide a predetermined number of subbands for the Y, U and V components whereby a selection of data may be made to provide a base layer video data stream and additional layers of video data so that a user may determine the resolution and visual quality to be displayed by such user.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be made to the following detailed description taken in conjunction with the accompany drawings in which:

FIG. 10 is a table illustrating a Delta Bw Index table for determining changes to be made in thresholds for detecting motion between frames of a color video signal FIG. 11 is a table illustrating the different thresholds that are obtained by a newly generated Bw Index for the next frame of a color video signal.

Similar numerals refer to similar parts in all FIGURES.

DETAILED DESCRIPTION OF THE INVENTION

Figure 1:
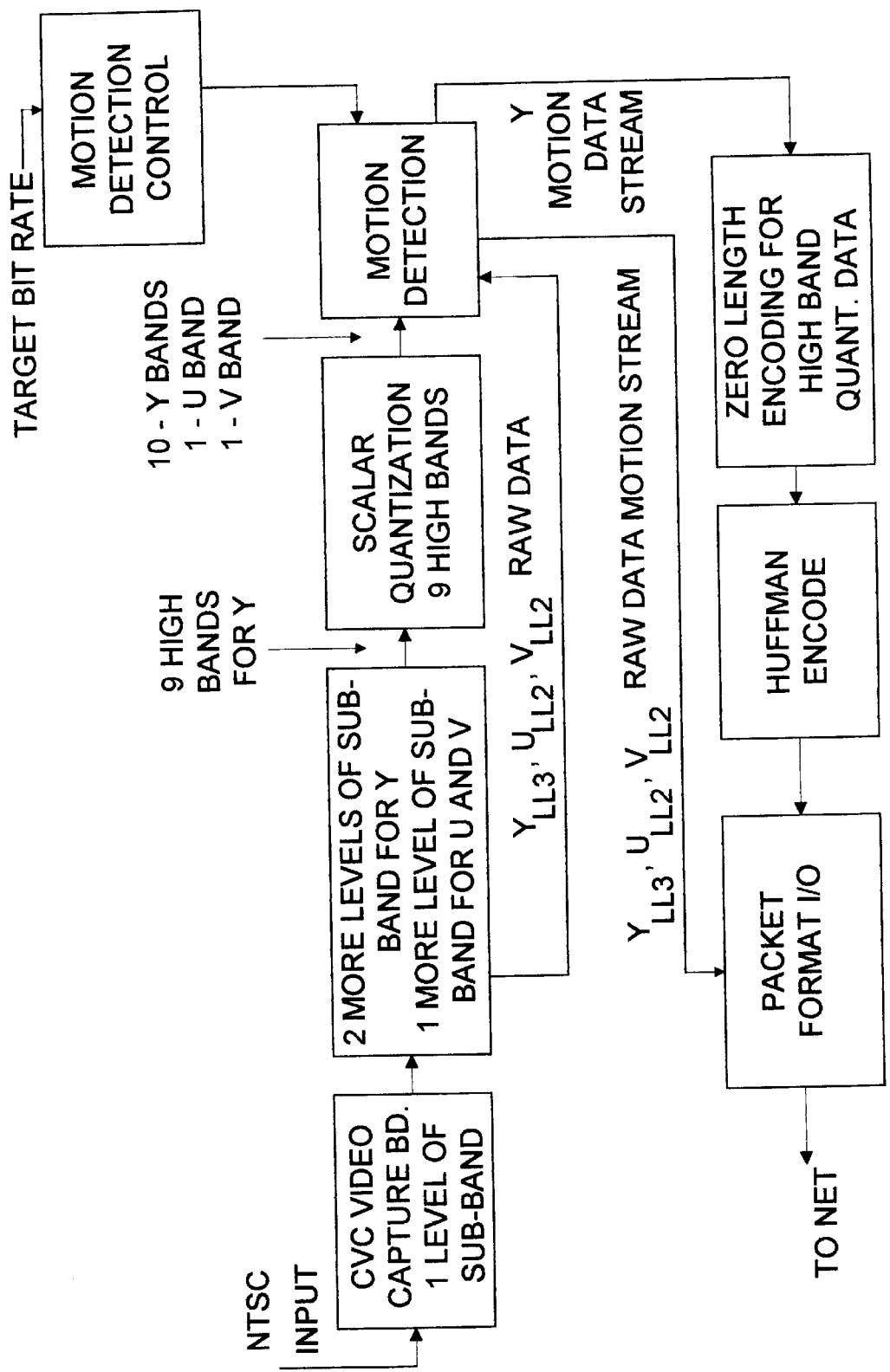
FIG. 1 is a functional block diagram of the operation of the encoder of a CODEC operated accordance with a preferred embodiment of the present invention.
Figure 12:
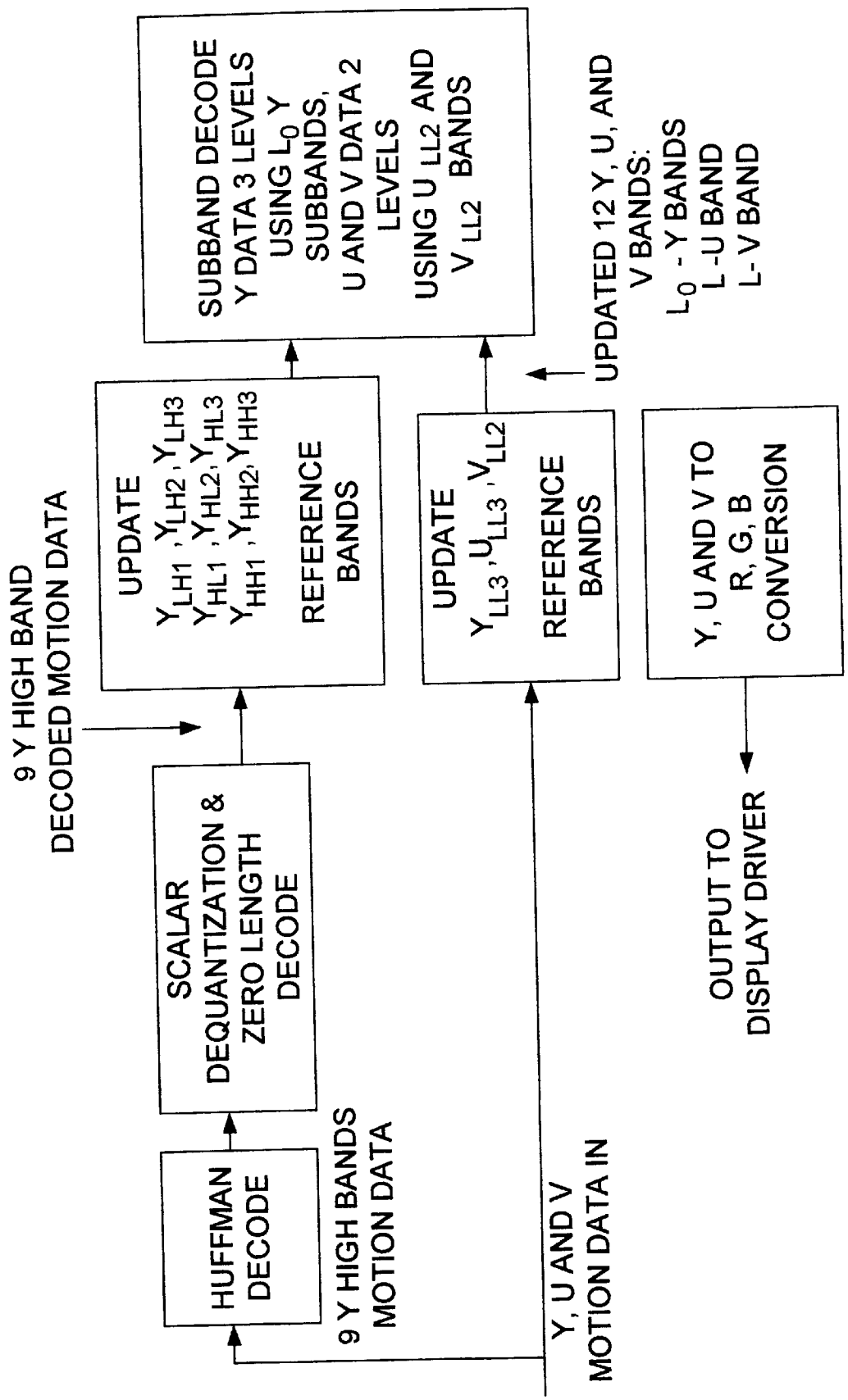
FIG. 12 is a functional block diagram of the decoder of the novel invention.

Referring now to drawings in detail, and in particular to FIG. 1, reference character 10 generally designates a functional block diagram of the encoder section 12 of a continuously adaptive digital video compression arrangement illustrating the novel method of the present invention for a web streamer. This arrangement provides compression/decompression of color video in what is known as a CODEC system. The functional block diagram of the decoder section 14 of the CODEC is seen in FIG. 12. Preferably, the novel method of the present invention is performed by software that has been provided to suitable data processing means of both the encoder and decoder sections of the CODEC.

For ease of understanding the novel method and systems of the present invention will be generally described and then a more detailed description of the invention will be presented. Typically a video signal is produced as an analog signal from a video camera or a VCR that captures a sequence of individual frames representing a moving scene. As a first step preceding the compression of the video signal, the system performs a set of functions to transform the analog video signal into a preferred proper format for compression. These functions include frame capture, analog to digital (A/D) conversion and transforming individual color components from RGB to YUV, 4:2:2 format. The window size is adjusted to a video format known as the Common Intermediate Format (CIF). The next step is to compress the digitized video signal to meet the requirements of an output data rate that is established by the receiver resources of the client user or, if there are multiple users that are leaving or joining the video distribution network, the receiver resources of the least capable user and also the presently available bandwidth on a channel that is subject to continual variance.

The first step in the novel compression step of the CODEC of the present invention is to spectrally decompose each color into frequency subbands using wavelet transforms. There are known image compression techniques such as JPEG, MPEG, and P*64 that have used transform techniques such as discrete cosine transform (DCT) to project the video samples as appropriate basis functions and then to encode the resulting coefficients. These transforms are based on transforming a block of video data, such as 8×8 pixels, for JPEG or MPEG and therefore have a block constraint and, thus, fail to exploit interblock correlations. The discrete cosine transform or the related Fourier transform work under the assumption that the original time domain signal is periodic in nature. As a result it has difficulty with signals having transient components, that is signals that are localized in time. This is especially apparent when a signal has sharp transitions.

Another problem is that the Fourier transform of a signal does not convey any information pertaining to translation of the signal in time. To overcome these problems in the known art the compression arrangement of the present invention uses wavelet transforms which overcomes these problems by choosing basis functions that are localized both in time and frequency called "wavelets". The wavelet representation is very suitable for non-stationary signals such as a sequence of video images having motion. The technique of compression by quantization and encoding the wavelet coefficients relies on the assumption that details at high resolution are less visible to the eye and therefore can be eliminated or reconstructed with lower order precision while still maintaining good to excellent display visual quality. Thus, the wavelet coefficients are coded according to their location in frequency bands and their importance for the quality of the final reconstructed image.

The CODEC of the present invention further utilizes the multiresolution property of the wavelet transforms to decompose the signal in multiple frequency bands, both in the vertical and horizontal directions. Subband coding using wavelet transform thus forms the basis for a layered CODEC where image quality can be improved by successively adding more details in additional video data streams to improve the quality of the reconstructed image.

As an example, consider the instance where this technique of successive approximations can be useful in providing the same video image to different customers or clients on a multicast network with each customer having different resources available. Each client can use the base layer to receive a coarse version of the image and more details can be fetched by using more details available in successive subbands.

Once the wavelet transform has been performed, each subband is a transformation of the original image based on the frequency filter designated for that subband. The present invention provides a scalar quantization routine that quantizes the coefficients derived from the transform to achieve low distribution and meet a targeted bit rate constraint. A bit allocation has been developed that allocates different bits to each coefficient based on the subband level and the variance of each subband. Based on characterization of a large number of images a bit allocation arrangement has been designed that allocates a different number of bits for each frequency bin and each subband level, as will be described in greater detail hereinafter.

The present invention also uses a novel arrangement to determine motion detection between successive frames to send only data representative of moving blocks. The motion detection algorithm of the present invention is based on two variable thresholds. The first threshold is based on the difference in the intensity level between corresponding pixels between two successive frames. If this difference exceeds that threshold as it is set at that moment the pixel is declared to have moved. The second variable threshold is set on the number of pixels that have moved within a block of pixels. The compression is controlled by varying both thresholds.

The CODEC of the present invention operates on a target bits per frame rate to provide a digital color video data stream. This output color video data stream, which is a continuously variable target bits per frame rate, is variable to be commensurate with the actual bandwidth of the transmission channel which is subject to continual variation. The target bits per frame rate can also be continually adapted to be commensurate with the decoder's capability of the least capable receiver of a client user to handle the received data color video data steam in real time. To achieve this targeted output rate the compression method of the present invention adaptively adjusts these two thresholds to vary the intensity level and the count of moving pixels as will be described in detail hereinafter.

The novel method of the present invention also teaches providing, as a last stage of the encoder section 10, a lossless entropy coder consisting of a run-length coder and a variable-length coder. The run length encoder compresses the video data stream by representing consecutive zeroes by their run length when a zero run is present. The decoder section 14 which preferably exists as software in a client user reverses the process by generating the appropriate number of zeroes between two nonzero data.

The lossless entropy encoder also provides a variable-length encoder in the form of a novel Huffman encoder. The variable length code used provides further lossless compression by assigning the shortest code to the most frequently occurring gray levels within an image and the longest codes to the least frequently occurring gray levels. Huffman codes provide the optimum mapping between the pixel value and the code word and has been adapted for the CODEC provided by the present invention The audio signal which may accompany the input color video signal is also compressed by any one of a number of known audio compression systems and is multiplexed with the compressed output digital color video data stream and sent through a suitable network interface for proper formatting before it is transmitted on a network.

The network interface consists of the internet protocol (IP) and the transmission control protocol (TCP) as the basic protocols for the video/audio distribution in a web streamer. To manage all functions required for efficiently sending video and audio data streams over existing networks, a number of other protocols such as real-time transport protocol (RTP), the real-time control protocol (RTCP) and resource reservation protocol (RVSP) could also be considered. The method and system taught by such method has been designed to use these protocols as required to provide an integrated multimedia networking service with standard internet protocols.

Figure 13:
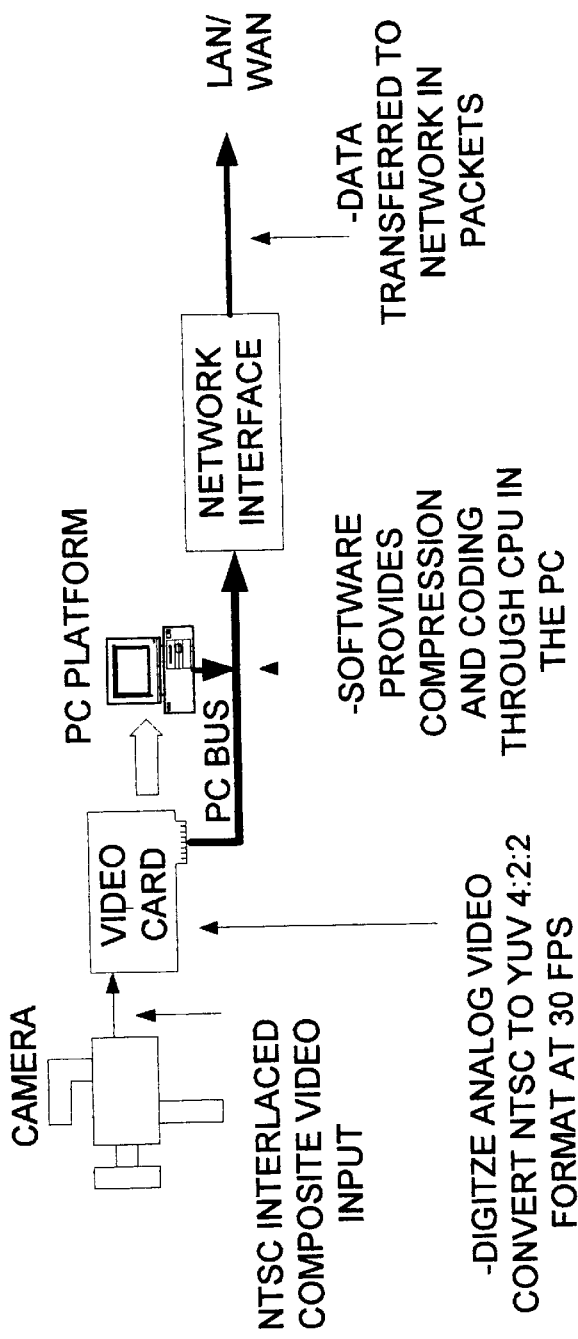
FIG. 13 is a diagram of one physical embodiment of the CODEC for performing the steps of the invention.

To describe now in detail the novel method and arrangement taught by such method to provide a continuously adaptive digital video compression arrangement for a web streamer, reference is again made to FIG. 1 which shows the functional block diagram of the encoder section 12. For ease of illustration, a portion of the encoder section 12 is shown in FIG. 13 as a video capture board that can be plugged into a PC but preferably the entire encoder section is provided as software which is loaded into a suitable data processing means, such as a PC. The input into the encoder section 12 is a NTSC analog signal from a suitable video camera or a VCR. The input analog color video signal is fed to a video capture board, as seen in the embodiment of FIG. 13, which can be plugged into any personal computer having sufficient data processing capability such as 486 or greater capability. The analog color video signal is received one frame at a time and the image is digitized to 640 pixels vertically and 480 pixels horizontally. The digitized video signal is converted in YUV, 4:2:2 format where the luminance component Y is kept at full bandwidth while the two color difference or chrominance components U and V are reduced in bandwidth and therefore down sampled to 320×240 pixels. The data capacity for the color information is then reduced by one-half by taking advantage of the relatively poor color acuity of human vision.

The frame rate is maintained at 30 frames per second according to NTSC. Each pixel is quantized to 8 bits to provide 256 gray levels. Using 4:2:2 sampling, a 2×2 block of pixels will use (4+2+2)×8=64 bits or an average of 16 bits per pixel. For a frame size of 640×480 pixels at a frame rate of 30 frames per second amounts to an uncompressed data rate of 640×480×16 30=147.46M bits per second. Because this rate is too high for most applications, further reduction in the data rate is achieved by reducing the window size from 640×480 pixels to 320×240 pixels for the luminance component Y by filtering and subsampling. Similarly, the size of chrominance components U and V is reduced to 160×120 pixels each, and the frame rate is reduced to 15 frames per second. This format is referred to in the art as 4:2:0 sampling. With 8 bits per pixel the YUV coded 4:2:0 system has an average uncompressed 12 bits per pixel. The uncompressed data rate is now 320×240×12×15=13.82M bits per second.

As previously indicated, encoder section 12 is preferably provided entirely in software but in the event that a plug in board is provided, it may further reduce the video data by combining interlaced fields in each frame, low pass filtering using finite impulse filters and decimating to a window size of 160×120 pixels in YUV, 4:2:0 format at 15 frames per second.

Figure 6:
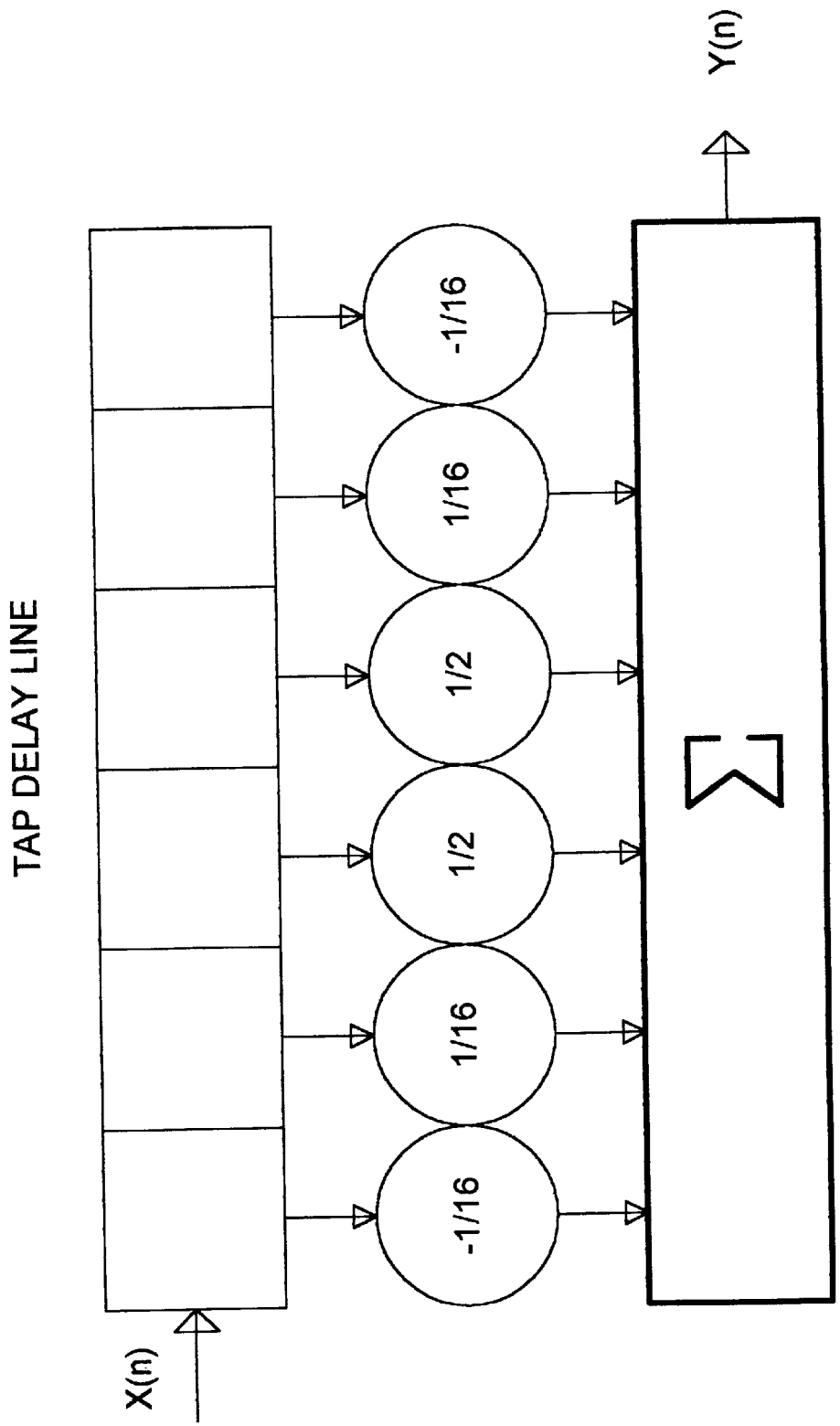
FIG. 6 is a representation of the wavelet 6-tap FIR filter used in the quantization step of the invention.
Figure 7:
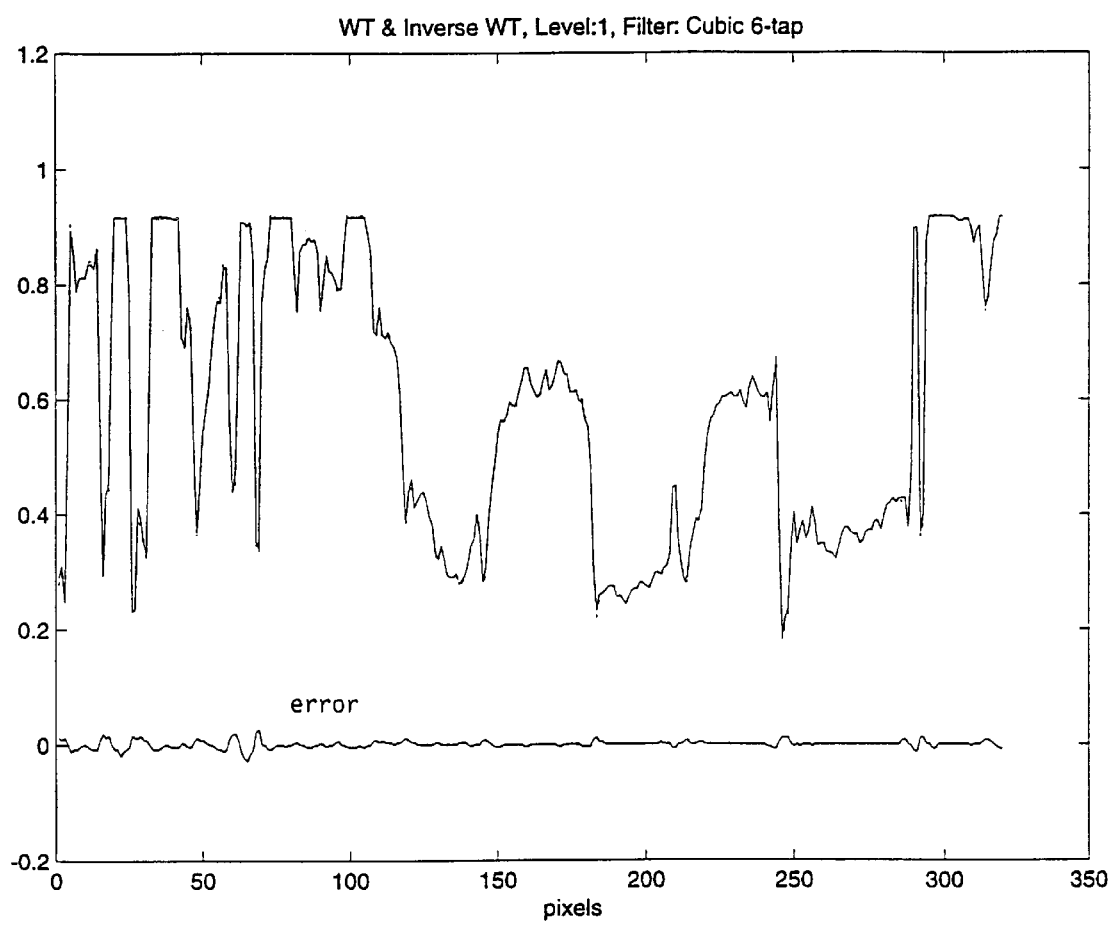
FIG. 7 illustrates the original and reconstructed intensity of a line chosen in an image, with the corresponding error shown at the bottom of each curve, having used a 6-tap FIR filter with a first level subband coding.
Figure 8:
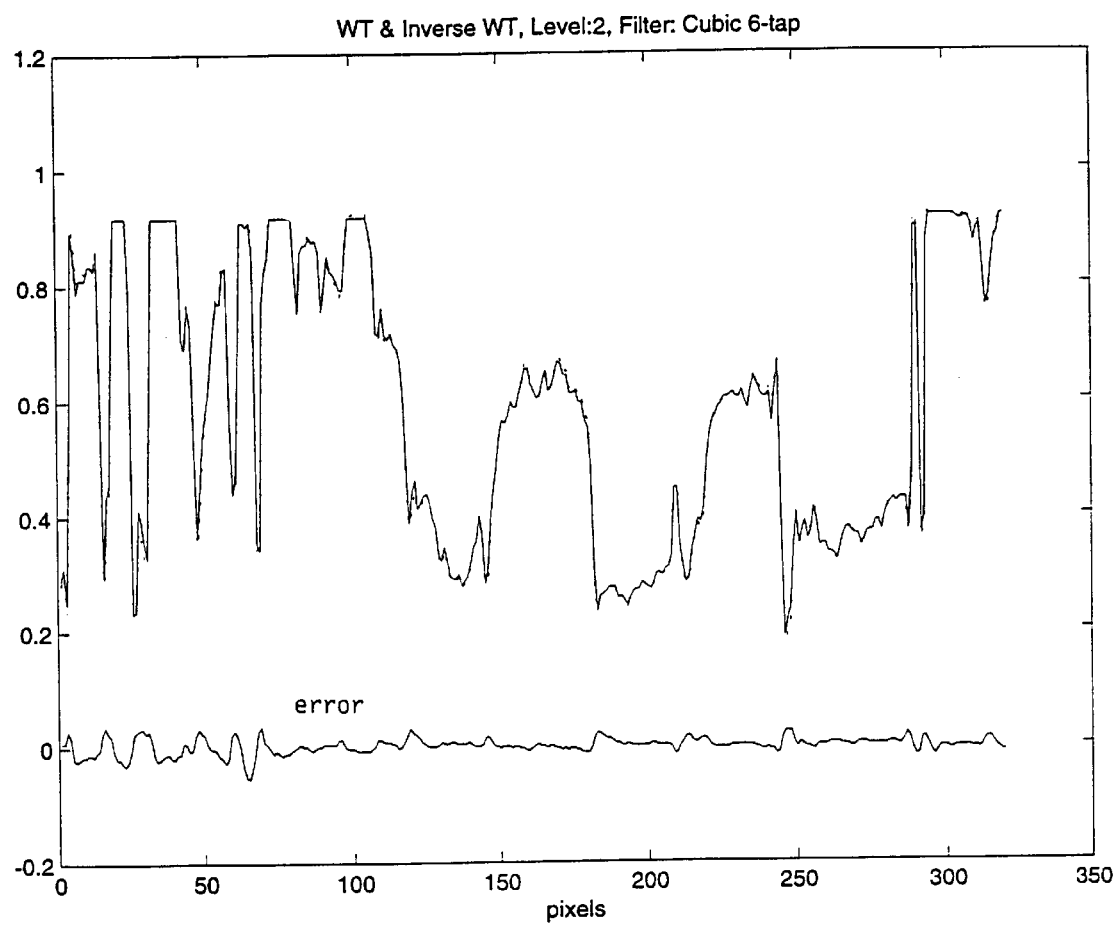
FIG. 8 illustrates the original and reconstructed intensity of a line chosen in the same image of FIG. 7, with the corresponding error shown at the bottom of each curve, having used a 6-tap FIR filter with a second level of subband coding.
Figure 9:
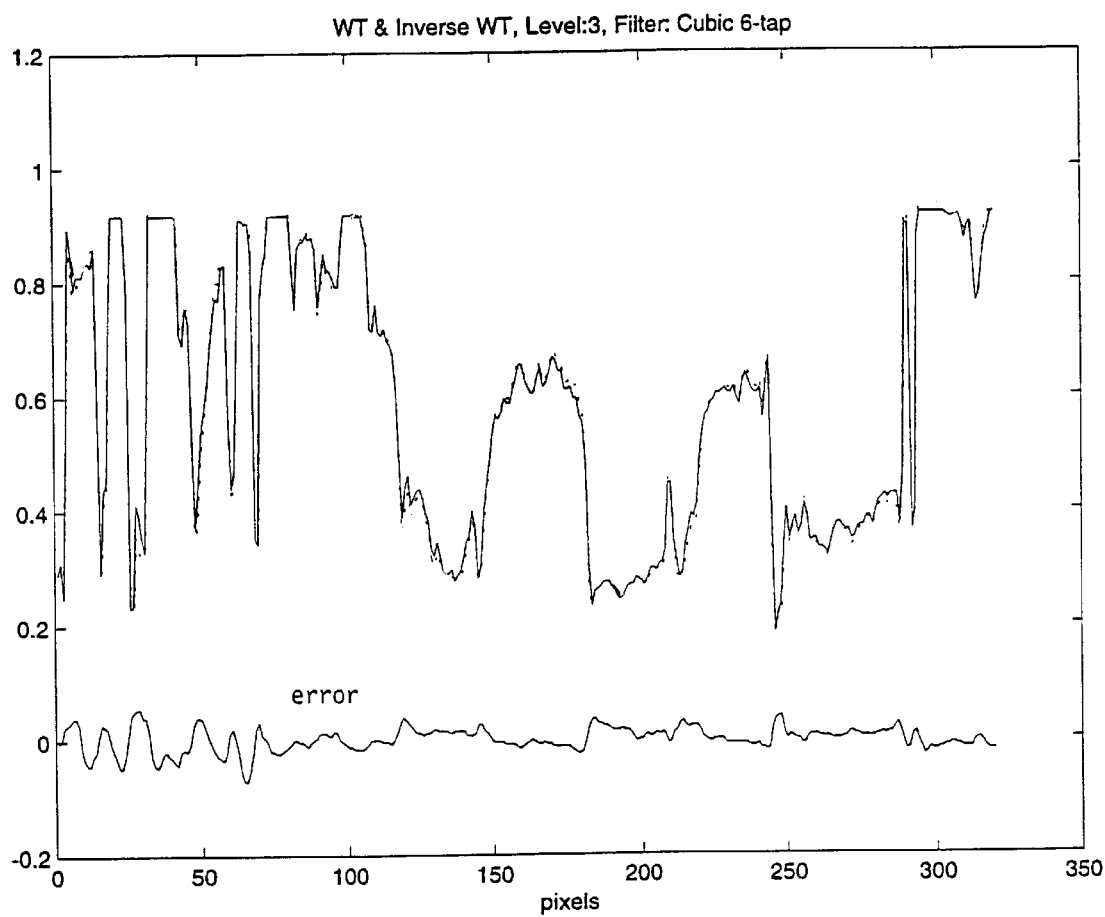
FIG. 9 illustrates the original and reconstructed intensity of a line chosen in the same image of FIG. 7, with the corresponding error shown at the bottom of each curve, having used a 6-tap FIR filter with a third level of subband coding.

The reduced window size 160×120 pixels frame is now decomposed using wavelet based subband coding filters both in rows and columns direction to obtain four frequency subbands and the output is decimated in 2:1 ratio to obtain a Y component at 80×60 pixels per subband while the U and V components are decimated to size 40×30 pixels each. An exemplary wavelet based subband coding filter arrangement used to advantage in the present invention is seen in FIG. 6. The captured image at this point has been converted to YUV, 4:2:0 format where the U and V frames are one-fourth size of the Y frame.

Figure 2:
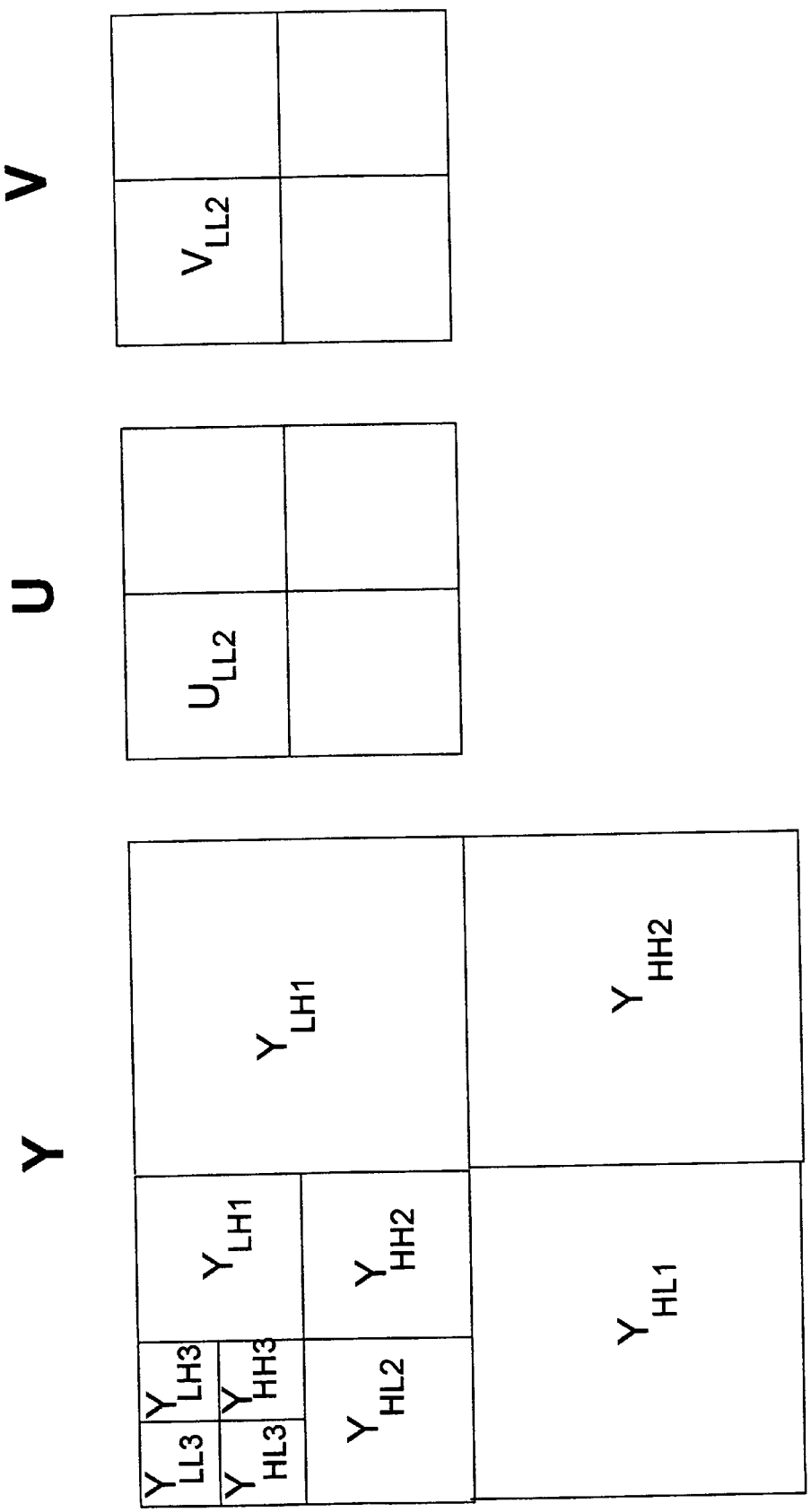
FIG. 2 is a pictorial representation illustrating the conversion of a color video signal from a RGB format into a YUV format and subsequent spectral decomposition into three multifrequency subbands.

For ease of understanding the following discussion relating to the subbands for the Y, U and V components, reference should be made to FIG. 2. The four subbands of Y are then designated as $Y_{LL1}$, $Y_{LH1}$, $Y_{HL1}$ and $Y_{HH1}$ components with the subscript LL describing the low-low band in the horizontal and vertical directions for one level of subband coding. Similarly, the subscripts LH, HL and HH indicate the low-high, high-low and high-high bands and the subscript 1 beside each subband indicates the first level of subband coding. In the instance where there is a plug-in board in the computer of the encoder section 12, such plug-in board would have enough memory to store up to four finished frames in a FIFO buffer. Each subband of Y, namely $Y_{LL1}$, $Y_{LH1}$, $Y_{HL1}$ and $Y_{HH1}$, has 80×60 pixels each. Similar subbanding operations are applied to the U and V components with resulting subbands $U_{LL1}$, $U_{LH1}$, $U_{HL1}$, $U_{LL1}$ and $V_{LL1}$, $V_{LH1}$, $V_{HL1}$, $V_{HH1}$ with 40×30 pixels in each subband. However, only $U_{LL1}$ and $V_{LL1}$ are retained and the other six subbands are discarded.

The spectral decomposition performed to get four subbands each for the Y, U and V components uses two filters, one a low-pass filter and the other a high-pass filter, as seen in FIG. 6. These filters are based on wavelet transform and are implemented using a 6-tap FIR filter design with the following coefficients:

Low-Pass [−1/16, 1/16, 1/2, −1/16, 1/16]

High Pass [−1/16, −1/16, 1/2, −1/16, −1/16]

These coefficients are initially obtained in floating point from the design of the wavelet transform and then rounded off to powers of 1/2 to perform multiplication by a shifting operation. This results in speeding up the encoding process for real-time operation.

FIG. 2 illustrates the subbands for the Y, U and V components. Three stages or levels of frequency decomposition are shown for the Y component and only two stages for the U and V components. While only three levels of frequency decomposition are illustrated, it is within the scope of this invention to provide additional bands of spectral decomposition that could provide layers of data suitable for some visual image requirements. Such decomposition is preferably performed by a data processing means performing in accordance with a software routine but the first stage of subbands could be performed in the hardware plug-in card as previously noted.

For the notation YLLi, i=1,2,3 and corresponds to the ith level of subband coding for the YLL component, the notation applies similarly for the other subbands.

Figure 3:
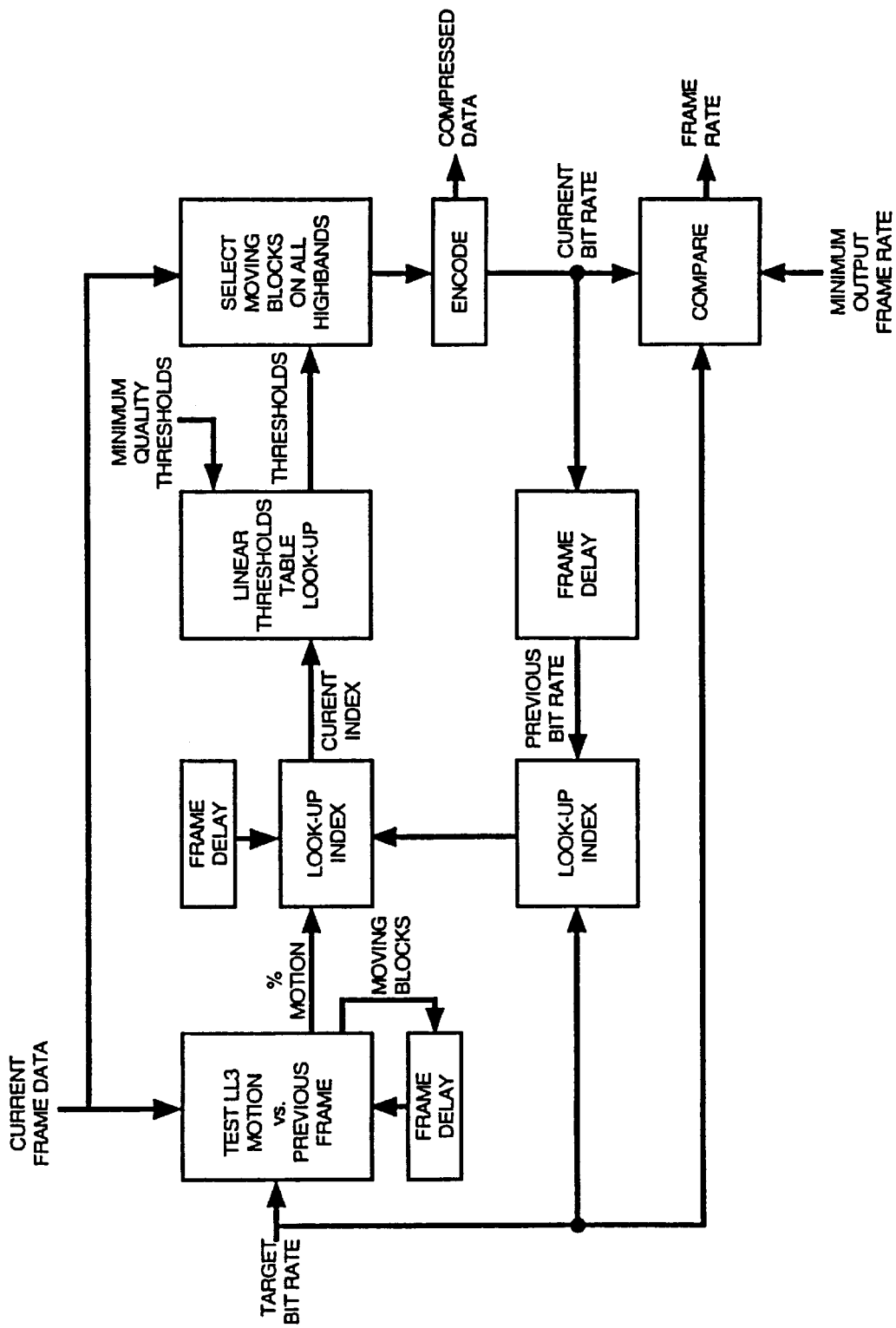
FIG. 3 is a representation of the motion detection algorithm used in the encoder of FIG. 1.
Figure 4:
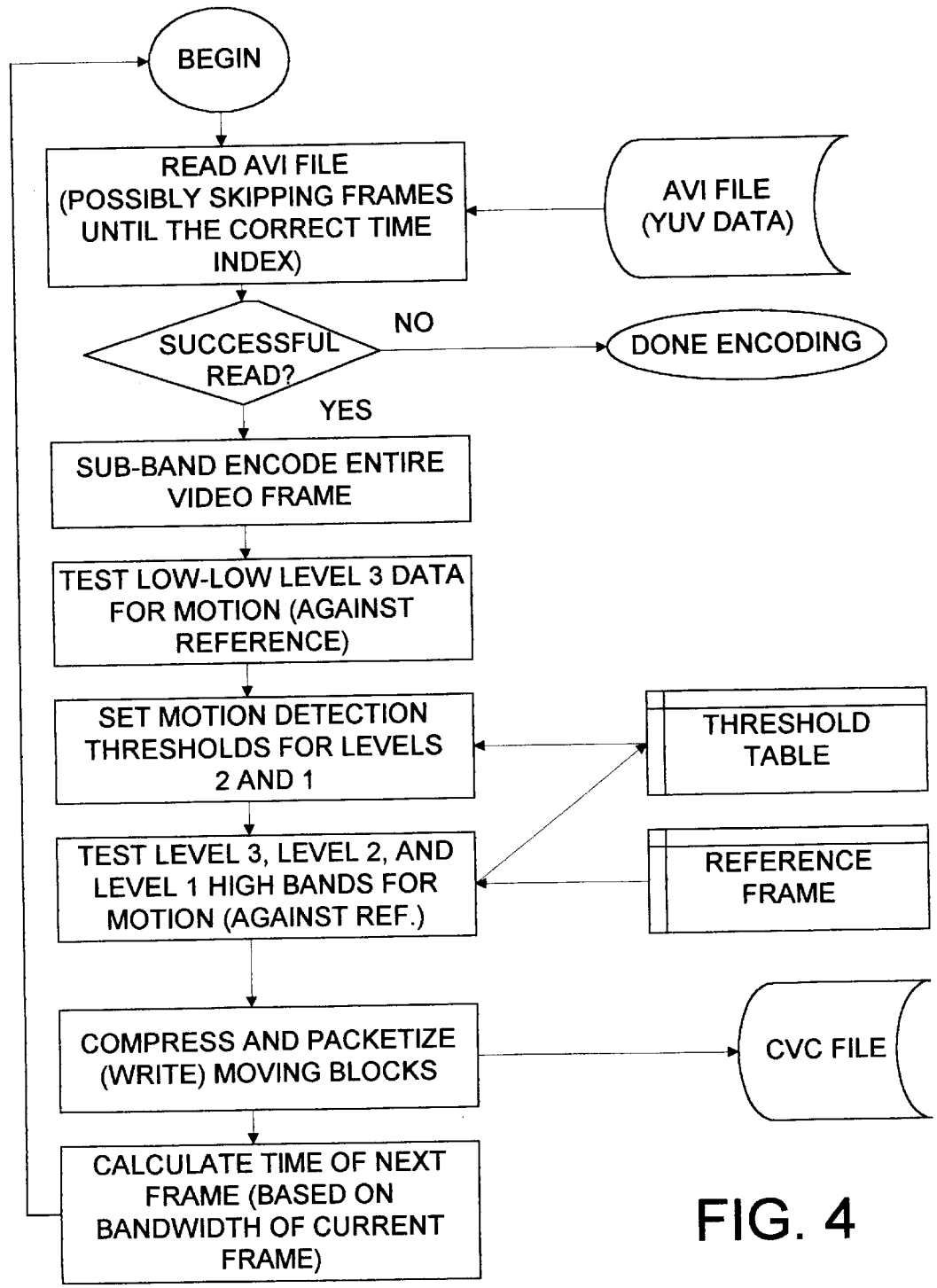
FIG. 4 is a motion detection flow diagram of the operation of the algorithm of FIG. 3.

The quantization process in rounding off from the floating point coefficients to coefficients which are powers of 1/2 produces a small amount of error. The filter design was chosen so as to minimize this error. FIGS. 3, 4 and 5 show the original and reconstructed intensity of a line in an image illustrating one level, two levels, and three levels of subband coding with the corresponding error show at the bottom of each curve using a 6-tap filter. As can be seen from these curves using integer coefficients in the filter introduces an error that is relatively small. In the instance of one level of coding the error is insignificant. Similarly, two levels of coding produces a very minor error and even in the event of three bands of coding the level of error is relatively insignificant when taking into account the acuity of the human eye.

Since the filters are FIR filters they need to be initialized. The boundaries of the input frame are augmented by wrapping or padding the first pixel of each row two times to the left, wrapping or padding the last pixel of each row two times to the right, wrapping or padding the first of each column two times upwards, and wrapping or padding the last pixel of each column two times downwards. Wrapping of extra pixels is required to initialize the filters and during the final output of the last pixel.

The input frame is linearly filtered row-wise and column-wise in four ways: Low-pass rows-low pass columns, low-pass rows-high -pass columns, high-pass rows-low-pass columns, and high-pass rows-high-pass columns. As the input frame is filtered it is also decimated by a factor of 2. Thus, the final filtered frames will each be one-fourth the sized of the input frame. Each of these subbands can now be treated as an independent stream and is processed further through motion detection to detect motion between successive frames and providing a dynamic priority to dynamically adjust the data rate of the output color video data stream to meet a variable target rate output based on the presently available network resources such as the available bandwidth of the transmission channel, quality and resolution desired by the client users, and receiver resources of the clients.

As indicated in FIG. 1, the output after the three stages of subband coding consist of the following subbands with their size. The Y components consist of the ten subbands listed below:

$Y_{LH1}$, $Y_{HL1}$, $Y_{HH1}$: 80×60 pixels $Y_{LH2}$, $Y_{HL2}$, $Y_{HH2}$: 40×30 pixels $Y_{LH3}$, $Y_{HL3}$, $Y_{HH3}$, $Y_{LL3}$: 20×15 pixels $Y_{LL3}$, is identified as the Low-Low band and the rest of the nine Y bands are identified as the high bands.

For U and V components:

$U_{LL2}$ and $V_{LL2}$: 20×15 pixels

Only the noted $U_{LL2}$ and $V_{LL2}$ subbands are used in the present arrangement and the rest of the subbands for the U and V components are discarded.

Figure 5B:
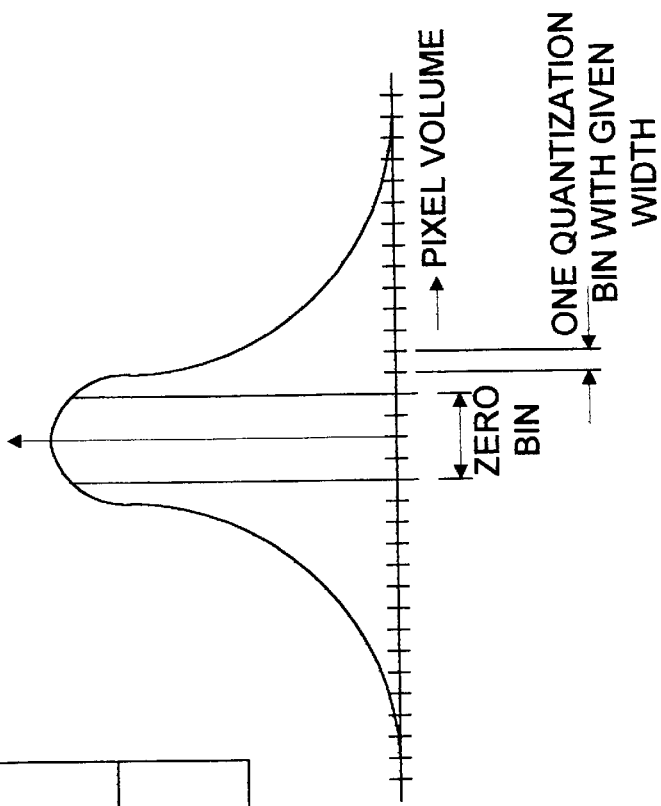
FIG. 5B is a representation of a typical histogram of an image and several parameters used for scalar quantization.
Figure 5A:
FIG. 5A is a representation of a table used in the quantization step of the present invention.

The method of the present invention teaches performing a scalar quantization as shown in FIGS. 5A and 5B. As will be illustrated in greater detail in FIG. 1, the $Y_{LL3}$, and $U_{LL2}$ and $V_{LL2}$ subbands are not quantized and are sent as raw data or as a base layer data stream with full resolution.

The scalar quantization on the nine high subbands of the Y component uses a technique based on three parameters. These parameters are (1) number of quantization levels, (2) zero bin size, and (3) step size width of quantization. The table shown in FIG. 5A illustrates these parameters for the three levels of subbands. This table was optimized by experimenting histograms of various images showing the number of pixels versus the quantization level. A typical histogram for an image is shown in FIG. 5B, along with the scalar quantization.

Referring again to FIG. 1, it will be seen that the method of the present invention teaches further compressing the image by using motion detection between successive frames to send only the moving blocks. Motion detection is performed for all frames in an image sequence, including the first frame. The motion detection process involves determining whether two thresholds have been exceeded for a block of pixels. As seen in FIG. 1, the motion detection process is updated on a frame by frame basis by determining a new target bit rate on the basis of whether the output color video data stream was commensurate with the available bandwidth for the transmission channel and the receiver resources of the least capable receiver of a client user. The pixel block size will vary depending on the subband level as will be described in detail later.

The two thresholds for each pixel block are defined so that if:

(a) Intensity check: $|P'_i - P'_j| \geq T_1$

Where $P_1$ and $P'_1$ represent intensity levels for corresponding pixels in the current and previous blocks.

(b) Number of pixels in a block check: if the number of pixels satisfying step (a) $\geq T_2$.

If these two variable thresholds have then exceeded then the block is declared to have moved, otherwise not. The blocks that have moved are processed further in accordance with a loss-less compression algorithm, namely, run-length and variable length coding such as Huffman coding for further compression as will be discussed in greater detail hereinafter. The non-moving blocks of raw data and the moving blocks data, after loss-less compression are combined for network packet formation as shown in FIG. 1.

In order to keep the output data stream at desired level a target bandwidth is selected based on the transmission channel capacity and the receiver capability of the least capable receiver of a client user. The noted thresholds $T_1$ and $T_2$ are automatically updated or changed on a frame by frame basis by monitoring the actual bandwidth of the transmission channel and generating a control signal from the difference between the actual bandwidth and the target bandwidth to vary or reset $T_1$ and $T_2$ as will be described in detail hereinafter.

For the Y component, the 4×4 pixel blocks of the entire frame are classified as moving or non-moving blocks in the $Y_{LL3}$ subband on the basis of the thresholds in steps (a) and (b) above. For moving blocks detected in the $Y_{LL3}$ subband, all of the corresponding pixels in all nine Y high bands are sent.

For non-moving blocks in the $Y_{LL3}$ subband, motion detection is performed on the blocks in the $Y_{LH3}$, $Y_{HL3}$ and $Y_{HH3}$ subbands.

For non-moving blocks in the third level high bands $Y_{LH3}$, $Y_{HL3}$ and $Y_{HH3}$, motion detection is performed on the second level high subbands and for all moving blocks detected the corresponding pixels in all of the ten Y subbands is sent.

For non-moving blocks only the raw data for the $Y_{LL3}$ subband is sent and no other data from the other nine Y subbands is sent.

For the U and V components since there are only the subbands $U_{LL2}$ and $V_{LL3}$, only the motion data stream is sent for each component along with the motion data of $Y_{LL3}$ component as raw data, without scalar quantization, as shown in FIG. 1.

For each frame, the size of the motion blocks at the various levels is as follows:

| | |
|---|---|
| Level LL3, LH3, HL3, HH3 | Block size: 1 pixel |
| Level LH2, HL2, HH2 | Block size: 4 pixels |
| Level LH1, HL1, HH1 | Block size: 16 pixels |

Motion video may be considered as a sequence of images that may consist of different scenes involving low to high motion. In order to maintain a reasonably constant output data rate, the method of the instant invention provides an adaptive arrangement to adjust such output data rate to be commensurate with the available transmission channel bandwidth and the receiver resources of the client users that is based on the following two observations. The first is that motion and resolution in an image can be traded off since the human eye is not sensitive to details in a high motion picture sequence. The second is that higher resolution in an image is influenced by the higher subbands. That is for more details in an image, higher subbands need to be included in sending the video data stream.

The motion detection step and the adaptive resetting of the motion thresholds based on updating on a frame by frame basis will be described step by step in detail. Before describing the algorithms in detail, certain definitions should be considered.

Movcoef LL3=Number of moving coefficients in the LL3 subband in the current frame.

Previous movcoef LL3=Number of moving coefficients in the LL3 subband in the previous frame.

Coef-diff=Movcoef LL3-Previous movcoef LL3.

Target Bw=bytes per frame desired for the output.

Previous Bw=Computed bandwidth in bytes per frame for the previous frame.

Bw ratio=Target Bw/Previous Bw

Delta Bw=Incremental bandwidth index determined for the Delta Bw Index Table of FIG. 10.

Bw index=An index represented by an integer from 0 to 6. The number 0 represents high motion and there low resolution and the number 6 represents low motion and therefore high resolution.

The motion detection algorithm and adaptive bandwidth control is shown in function form in FIG. 3 and the motion detection flow diagram is shown in FIG. 4. This process of the present invention is performed by the following steps:

(a) The subband coding is performed and the motion detection is performed using the thresholds $T_1$ and $T_2$ for the $Y_{LL3}$ subband and the Movcoef LL3 is computed.

(b) With the Movcoef LL3 and the Previous movcoef LL3, the relative motion in the current frame is computed, which is the computed Coef-diff.

(c) With the previous Bw Ratio and the Coef-diff, the Delta Bw is determined from the Delta Bw Index Table of FIG. 10.

(d) a new Bw index is then determined by adding the current Bw Index and the Delta Bw.

(e) New thresholds $T_1$ and $T_2$ for each subband type are then determined from the table of FIG. 11 by use the new Bw index and list of the subband types.

(g) Motion detection is then performed for the high bands and the whole frame is encoded.

(h) The new bandwidth (New Bw) and the frame rate (frame-rate-value) are then computed.

The first frame is compared to a reference frame, since there is no previous frame, consisting of all pixels et at a certain gray level. The gray levels are indexed 0 to 255 to provide 256 intensity levels for each pixel. The intensity level for each pixel can be represented by 8 bits or one byte.

The motion detection algorithm for the first frame is described by the following steps.

After subband coding and using the motion detection criteria as described above, to process the first frame one computes the number of moving coefficients in band $Y_{LL3}$, which is Movcoef LL3.

Next one computes the total number of number of coefficients in the LL3 subband, which is OFFVAL.

Next the first Band Width index is computed as follows:
if the Movcoef LL3>5*OFFVAL/6 the first image is a high motion image so that one has to apply a low resolution, thus the current BW index=1.

However, if the Movcoef LL3>OFFVAL/3, the first image is a low to medium motion image, so that one needs to apply a medium resolution., thus the current BW index=3.

Otherwise this image is definitely a low motion image, so that high resolution is applied so that the current BW index=6.

The Movcoef LL3 is now stored in a variable register as Previous movcoef LL3 in order to reuse it in the following frames.

With the new current BW index one can then obtain the new motion thresholds by referring to the table shown in FIG. 11 which identifies the $T_1$ and $T_2$ threshold values and the High Bands Motion Detection routine is applied This last routing will encode the nine Y high subbands of the current fame by comparing them with the nine high bands of the previous frame and using the current BW index and its associated motion thresholds as identified in the table of FIG. 11.

Next one generates the new bandwidth which is new Bw=(Total Video Packet Bytes*90.0/Video Time) 88.0 where the Total Video Packet Bytes is the total number of bytes in all of the ten Y subbands and Video Time is the time to encode all of the ten subbands.

To this Bw value, one then adds the audio byte for the first image, if any. Thus, new Bw=Bw+mean Audio.

However, despite taking into account the motion characteristic of the image, the new Bw value may not be close to the target Bw value. To achieve the target Bw the frame rate must be adjusted to match the target Bw in accordance with the Frame Rate routine which is described in detail hereinafter. One then stores the new Bw in a variable (previous frame Bw), to be reused by the next frame.

The advantage of the Gray reference frame is that, independent of the image sequence, the initial frame (the Gray reference frame) is always fixed and know both to the sender and to the receiver. If at any time due to channel interruptions the video packet is lost, the a receiver can use the Gray reference frame to synchronize the image sequence. Another advantage is that whenever a new client wants to join a video conference in the middle of a running sequence, an initial reference frame is not required. The Gray reference frame that is available to the new client can be used to become synchronized with the video sequence. This avoids the necessity to transmit initial frames such as required by the MPEG type compression scheme. Also, initial frames will be required to be transmitted without any compression thereby adding additional overhead to the output data stream and thereby reducing compression.

To process further frames of the input color video data stream the following routine is pursued. After subband coding and using the motion detection criteria to detect motion, one computes the number of changing coefficients in LL3 which is Movecoef LL3. After setting some variables, one obtains the previous Bw since actual video Bw=previous Bw. Then the Bw ratio is generated which represents the ratio of the current Bw to the target Bw.

The Delta Band Width is used to correct the Bw Ratio as will be described. The Delta Band Width generates a new current Bw index by computing two values. The first one, Coef-diff, is computed with the motion characteristics of the current frame and the previous frame. The second value, Bw ratio, comes from the ratio between the Target Bw and the Previous Bw. These two values are used to specify a value in the table, the Delta Bw Index table, of FIG. 10. The value specified in such table is the Delta Bw Index value, which value is then added to the current Bw Index value which is then used to identify new thresholds in the table of FIG. 11.

This value is chosen by a process that involves first choosing the most appropriate column of the Delta Bw Index table of FIG. 10. After computing the difference of motion between the current frame and the previous frame, Coef-diff=Movcoef LL3−Previous Movcoef LL3, one then proceeds through an if-else if-else statement to determine the best column of the Delta Bw Index table.

If Coef-diff>2/3*Size LL3, SizeLL3 being equal to the number of coefficients in subband LL3, one switches from a low motion picture to a high motion picture, e.g., a scene change. One the picks the last column of the Delta Bw Index table which is the 7th column of such table.

Else if the Coef-diff>SizeLL3/24 and the Coef-diff<2/3*SizeLL3, one knows that there has been a switch from low to medium motion or medium to high motion. Thus, the 6th column is picked from Delta Bw Index table to identify a new Bw Index.

But if the Coef-diff>-SizeLL3/24 and the Coef-diff<SizeLL3/24 it is evident that both frames keep more or less the same motion characteristic and the 5th column of the Delta Bw Index table of FIG. 12 is selected. from medium to low motion or high to medium motion and the 4th column is selected in the Delta Bw Index table of FIG. 11.

Else if the Coef-diff<-2/3*Size LL3 then there is has been a switch from a high motion picture to a low motion picture, such as a still image, and the 3rd column is selected in the Delta Bw Index table.

The appropriate row in the Delta Bw Index Table is chosen in the following manner. One compares the ratio between the target bandwidth and the previous bandwidth to determine the appropriate row of the Bw Ratio column and then with the appropriate Coef-diff having been determined to select the appropriate column a Delta Index Value is selected. This Delta Bw Index is then added to the previous Bw Index to determine a new BW Index which is then used in the table of FIG. 11 to select the new thresholds. You now exit from the Change bandwidth and Adjust Band Width routine to complete the processing as for the first frame.

One then applies the High Bands Motion Detection routine as previously described. A new bandwidth is then generated by new Bw=(Total Video Packet Bytes*90.0/Video Time)*8.0. To this new bandwidth value, one then adds the audio byte, if any, for the first image. Thus, the new Bw=new Bw+mean Audio.

However as previously described, despite taking into account the motion characteristic of the image, the new bandwidth value can be far away from the target bandwidth. Thus, frame rate value=Change Frame Rate (target Bw/new Bw). One stores the new Bw in a variable register (previous frame Bw) to be reused by the incoming frame.

Since the frame rate routine is used in the two cases described above in detail, it is also described in detail. The main concern in this routine is when the current bandwidth is larger than the target bandwidth. This means that the bandwidth ratio of target Bw/current Bw is smaller than unity. If the bandwidth ratio<1 the frame rate needs to be modified to reach the target bandwidth.

If i=1 while i<RATE TABLE SIZE if the new frame rate tab rate [i] This is done so that one may stay between the maximum frame rate and the minimum frame rate if the tab rate [i−1]>=frame output rate and if the tab rate [i−1] and the loop is exited else the new frame rate=1.0 exit of while loop, else next 1 end while else if current Bw<target Bw the new frame rate=1.0.

For each frame, as previously noted, the size of the motion bocks at the various levels is as follows:

| Level LL3, LH3, HL3, HH3 | Block size: 1 pixel |
| Level LH2, HL2, HH2 | Block size: 4 pixels |
| Level LH1, HL1, HH1 | Block size: 16 pixels |

After the motion detection algorithm has been performed, with the updating of the motion thresholds as described in detail above, the low-band raw data, without scalar quantization form the $Y_{LL3}$, $U_{LL2}$ and $V_{LL2}$ bands is sent directly for packet formation to the network interface, as shown in FIG. 1. The nine high bands quantized motion data for the Y component is further compressed through run-length and Huffman coding before it is combined with the low band data in the packet formatting block.

As noted the last stage of the encoder consist of lossless entropy coding consisting of a run-length coder and a variable length. The run-length encoder compresses the input video data stream by representing consecutive zeroes by the run length when a zero run is present. The encoder counts the number of consecutive zeros until it reaches the last zero or the maximum zero run length.

The variable length code used provides further lossless compression by assigning the shortest code to the most frequently occurring gray levels within an image and the longest codes to the least frequently occurring gray levels. Huffman codes provide the optimum mapping between the pixel value and the code word and has been adapted for optimum use with the CODEC taught by the instant invention.

Determination of the Huffman code requires knowledge about the pixel value distribution within an image. Therefore, the first step in arriving at the Huffman code is to compute in real time the pixel value histogram of the image. Next a table is formed with the pixel values arranged in a column by descending order of probability occurrence. The next step in generating the Huffman code is to reduce the number of probabilities by combining the lowest two probabilities together to form one new probability. An new column is then generated using the other unmodified probabilities and the newly formed probability. This column is arranged in descending order of probabilities. Further reduction in probability is continued by generating additional columns that are formed by combining the two lowest probabilities and then rearranging the new set of probabilities in descending order of their value. This process of reducing the number of probabilities continues until there are only two probabilities remaining. The second phase of the Huffman coding starts at the last column, containing the two probabilities and working towards the first column assigns a set of variable length codes to each pixel value. During the process of moving from the last column to the second column, each time a probability is encountered that was formed by merging two probabilities together, an additional code symbol is assigned to the two probabilities that form this merged probability. This process of assigning codes continues until the first probability column is reached and all the pixels values have been assigned a variable length code. Decoding of the image is accomplished using a look-up table that translates the Huffman code to the corresponding pixel valve.

The audio is similarly compressed separately through readily compression algorithms known in the art and multiplexed with the video data.

FIG. 12. Shows the functional block diagram for the decoder section 14. Only the video decompression portion is illustrated as the audio portion is performed by readily available algorithms. The received audio data is separated from the video data and decompressed using readily available components and the decompression algorithm. The video data decompressor reverses the function performed by the encoder section 12. Finally, the decompression section converts the YUV video data back to the RGB format for display of the video images on the screen of a suitable receiver.

In summary, a novel method has been disclosed for compressing an input color video data stream for moving images for a web stream to be transmitted over a transmission channel having a variable bandwidth to client users having receivers that may receive data input at different acceptable data rates. The compression of such input color video data stream is continuously updated on a frame by frame basis in accordance with the presently available bandwidth of the transmission channel and the resources of the least capable receiver of a plurality of client users. The compression may be updated by adjusting certain parameters of the motion detection arrangement and by adjusting the frame rate of the output color video data stream of the encoder for web streaming of multiple layers of color data streams. Thus, a cost effective digital color video compression arrangement is provided for storage and distribution of good to excellent multimedia information on information networks using personal computers operating on provided software to accomplish the novel method of the invention.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A method for compressing input color video data for moving images for a web stream to be transmitted over a transmission channel having a variable bandwidth available to client users having receivers that receive data input at different acceptable data rates, which method comprises the steps of:

compressing an input color video data stream having a determinable frame rate for moving images on the basis of a target bandwidth on a data transmission channel having a variable bandwidth to provide a compressed output video data stream having a determinable frame rate;

transmitting the compressed output color video data stream to at least one receiver over said transmission channel;

determining the actual available bandwidth of the transmission channel on a frame by frame basis as the compressed output video data stream is transmitted to at least one receiver, changing the compression of said in put color video data stream in response to comparing the actual available bandwidth on said transmission channel during transmission of the present frame to the available bandwidth on said transmission channel at the time the last frame of said compressed data stream was transmitted thereover whereby the next frame of the subsequent transmission of said output color video data stream is transmitted in packets at a rate commensurate with the actual bandwidth available to a user of said transmission channel at the time of transmission of the previous frame of said data stream, continually determining the actual available bandwidth of the transmission channel as said compressed output color video data stream is transmitted to at least one receiver, and continually changing the compression of said output color video data stream in response to a control signal generated from a comparison between the present actual available bandwidth on the data transmission channel and the actual bandwidth on said transmission channel for the immediately previous frame of said data stream whereby the data rate of the packets of said compressed color video data stream is continually adapted to be commensurate with the available variable bandwidth on the transmission channel to dynamically control the packets of said compressed color video data stream, said compression of the input color video data stream includes providing a plurality of levels of subband coding of the input color video data stream, spectrally decomposing selected blocks of pixels of said subband levels to image transform coefficients representative of a level of movement within each pixel block and said control signal is determined by detecting the difference between the present available bandwidth of said output color video data stream and the available bandwidth of the color video data stream transmitted in an immediately previous frame and dynamically changing the rate of compression, as necessary, of said input color video data stream in response to said control signal to provide an output color video data stream in packets having a data rate commensurate with the available bandwidth on the transmission channel to receive such packets.

2. The method of claim 1 which further includes the steps of determining the data rate capability of the receiver of at least one client user to receive said output color video data stream, and adjusting the data rate of said output color video data stream to be an acceptable data rate for the receiver of the client user.

3. The method of claim 1 wherein the input color video data stream and the output color video data stream is presented in successive frames and the detection of motion is performed by determining whether a threshold of movement within blocks of image transform coefficients of a frame has been exceeded.

4. The method of claim 3 wherein the threshold of movement is provided by two thresholds with a first threshold being determined by the difference in intensity level between corresponding image transfer coefficients in two successive frames and if this difference exceeds said first threshold the image transform coefficient is declared to have moved and with the second threshold being set on the number of image transfer coefficients that have moved within a block of coefficients in a frame, and the rate of compression of the input color video data stream is controlled by varying the first and second coefficient thresholds in accordance with said control signal to achieve a desired output data rate.

5. The method of claim 3 wherein the data rate of the output color video data stream is further adjusted by adjusting the frame rate of said output data stream on a frame by frame basis whereby said data rate of said output data stream becomes commensurate with the available bandwidth on the transmission channel.

6. The method of claim 1 wherein the data rate of the output color video data stream is determined, in addition to the available bandwidth on the transmission channel, by the receiver capability of a client user in accepting output color video data stream from the transmission channel.

7. The method of claim 6 wherein the data rate of the output color video data stream is determined, in addition to the available bandwidth of the transmission channel, by the least capable receiver resources of a client user of a plurality of users.

8. The method of claim 7 which further includes providing a receiver having a decoder for a client user, which receiver receives the output color video data stream from the transmission channel and decompresses such output color video data stream in real time for suitable display image.

9. The method of claim 8 wherein the compression step provides a base layer output color video data stream that is transmitted over the transmission channel to a plurality of user clients to provide a basic image quality for each user client.

10. The method of claim 9 wherein the compression step further provides a plurality of additional data streams of color video data over said transmission channel to all user clients to permit a receiver of a user client to successively improve the resolution of the received display image and to provide more details for a reconstructed display image.

11. The method of claim 1 which further includes the step of providing a receiver in the form of a suitable digital computer which receives software that is digitally transmitted over the transmission channel to said digital computer for decompressing the received output color video data stream to provide a reconstructed display image.

12. The method of claim 11 which further includes the step of providing a suitable digital computer and operating such computer in accordance with software to provide such data compression step.

13. The method of claim 1 wherein the compression step may be varied to vary the output color video data stream to adjust the resolution, image size, and frame rate for the coded images being transmitted over the transmission channel.

14. The method of claim 1 wherein the data decompressing step may also be varied to vary the received output color video data stream to adjust the resolution, image size and frame rate of the decoded reconstructed visual image to be commensurate with a receiver of a client user receiving such output data stream.

15. The method of claim 1 which further includes the step of multiplexing a compressed digital audio data stream with the output color video data stream.

16. The method of claim 1 wherein the output digital color video data stream is packetized for distribution in an effective network throughput over the transmission channel to a plurality of client users.

17. The method of claim 7 which further provides the step of subjecting portions of the output color video motion data stream to loss-less compression prior to transmission over a transmission channel having a variable bandwidth available to each client user.

18. The method of claim 17 wherein said loss-less compression is provided by run-length encoding and Huffman encoding.

19. A cost effective method for compressing input color video data for moving images for the purpose of streaming a compressed output color video data stream over a packet switched network in the form of a data transmission channel having a variable bandwidth to client users having receivers that provide high quality visual images and which receive data input at different rates, which method comprises the steps of:

compressing an input digital color video data stream having moving images at a predetermined data rate on the basis of a target bandwidth available on a data transmission channel to provide a compressed output color video data stream comprising a plurality of digital video data streams representative of various levels of resolution of a visual image represented in successive video frames and spectrally decomposing the image frames of the input color video signal into a plurality of multilevel frequency subbands and to a plurality of levels and selecting from said frequency subbands a base level digital color video raw data stream that is transmitted in the output video data stream for creation of a base level visual image and at least two additional digital color data streams to provide additional visual details of a visual image as may be desired by a client user;

transmitting the compressed output color video data stream in packets of determinable length to at least one receiver over a data transmission channel;

determining the present bandwidth available on the transmission channel on a frame by frame basis as the compressed output video data streams were transmitted to at least one receiver;

adjusting the rate of compression of said input digital color video data stream in response to such determination on a frame by frame basis whereby the immediately succeeding transmission of a frame of said output digital color video data stream is commensurate with the present bandwidth available on said data transmission channel; and decompressing the output digital color video data stream at each client user to provide a color visual image having motion.

20. The method of claim 19 wherein the input digital color video data and the output digital color video data stream are presented in successive frames and the adjustment of the rate of compression is made on a frame-by-frame basis in response to a control signal generated by a comparison of the data rate of a color video data stream presently being transmitted for a frame to the immediately previous data rate of the previous frame.

21. The method of claim 19 which further includes providing the compressed output color video data stream to a plurality of client users as a base level visual image is provided to all clients for achieving a basic visual image and providing additional data streams to a client user to successively improve, as may be desired by such user, the resolution of the received visual image and to provide more details for the reconstructed visual image.

22. The method of claim 19 which further includes the step of adjusting the resolution, image size and frame rate of the visual image represented by the output color video data stream during the step of compressing the input color video data stream in response to a control signal generated by comparing the actual bandwidth on the transmission channel available to the presently transmitted video to the bandwidth on the transmitted channel available to the last transmitted frame of said video data stream.

23. The method of claim 22 which further includes the step of adjusting the resolution, image size and frame rate of the visual image represented by the output color video data stream during the step of decompressing said output color video data stream in response to a control signal generated by comparing the actual bandwidth on the transmission channel available to the presently transmitted to the bandwidth on the transmission channel available to the last transmitted frame of said video data stream.

24. The method of claim 19 wherein said spectrally decomposing the image frames of the input digital color video signal is performed by wavelet transform filters having outputs that are rounded off to powers of ½.

25. The method of claim 19 wherein the compression step includes performing scalar quantization on said additional digital color video data streams to generate quantized additional data streams, performing motion detection on said base level color video raw data stream and said quantized additional digital color video data streams and thereafter performing a loss-less compression coding routine on said quantized additional motion data streams to provide said output color video data stream comprising a motion detected base level data stream and motion detected quantized additional digital color video data streams.

26. The method of claim 25 wherein said loss-less compression coding routine includes run-length coding and Huffman coding.

27. The method of claim 26 wherein the Huffman coding includes generating tables for mapping between pixel values as represented by image transform coefficient values and a code word represented in the output color video data stream.

28. The method of claim 27 wherein said tables generated for the Huffman coding are renewed for each frame to provide optimum distribution of pixel values within the visual image represented by said output color video data stream.

29. The method of claim 19 wherein the rate of compression is also determined by the acceptable data rate of the least capable receiver of a plurality of client users and by a control signal generated by a comparison of the bandwidth of a data stream presently being transmitted for a video frame to the bandwidth on said channel that was available to the immediately preceding video frame of such data stream.

30. The method of claim 19 wherein the data compressing and decompressing steps are provided by data processing means that are operated by software.

31. The method of claim 19 wherein the decompressing step is performed in real time by a receiver of a client user without storage of such received color video data stream.

32. The method of claim 19 which further includes the step of multiplexing a compressed digital audio data stream with the output color video data stream.

33. The method of claim 32 wherein said multiplexed output digital video data stream is packetized as effective network throughput for distribution over a data transmission channel providing a packet switched network to a plurality of client users.

34. Cost effective method for compressing input color video data for moving images for the purpose of streaming a compressed output color video data stream over a packet switched network in the form of a data transmission channel having a variable bandwidth to client users having receivers that provide high quality visual images and which may receive data input at different acceptable rates, which method comprises the steps of:

compressing an input digital color video data stream having moving images at a predetermined data rate on the basis of a target bandwidth available on a data transmission channel to provide a compressed output color video data stream comprising a plurality of digital video data streams representative of various levels of resolution of a visual image represented in successive video frames and performing scalar quantization on said additional digital color video data streams to generate quantized additional data streams, performing motion detection on said base level color video raw data stream and said quantized additional digital color video data streams and thereafter performing a loss-less compression coding routine on said quantized additional motion data streams to provide said output color video data stream comprising a motion detected base level data stream and motion detected quantized additional digital color video data streams;

transmitting the compressed output color video data stream in packets of determinable length to at least one receiver over a data transmission channel;

determining the present bandwidth available on the transmission channel on a frame by frame basis as the compressed output video data streams were transmitted to at least one receiver;

adjusting the rate of compression of said input digital color video data stream in response to such determination on a frame by frame basis whereby the immediately succeeding transmission of a frame of said output digital color video data stream is commensurate with the present bandwidth available on said data transmission channel; and decompressing the output digital color video data stream at each client user to provide a color visual image having motion.

* * * * *